Jan. 15, 1952          R. I. BOBST          2,582,672

AUTOMATIC BALE TENSION CONTROL FOR BALING MACHINES

Filed June 23, 1948

INVENTOR.
RAYMOND I. BOBST
BY
Arthur O. Andersen
Atty.

Patented Jan. 15, 1952

2,582,672

UNITED STATES PATENT OFFICE 2,582,672

AUTOMATIC BALE TENSION CONTROL FOR BALING MACHINES

Raymond I. Bobst, De Soto, Wis.

Application June 23, 1948, Serial No. 34,798

4 Claims. (Cl. 100—23)

The invention is directed to automatic means for adjusting the tension chamber in a hay baling machine. It is particularly directed to a baler which can be drawn through the field, but it is equally well adapted for use with a stationary baler used for baling a variety of compressible materials.

In baling hay in a field the moisture content of the hay varies in different portions of the field, and the compressibility of the hay is inversely proportional to moisture content. The existing hay balers to which this invention may be applied, have two nuts at the rear of the machine for adjusting the tension. However, considerable experience is required before an operator is able to adjust the tension properly, and even an experienced operator must be ever alert to changes in the condition of material being baled, and he must leave his seat and adjust the tension whenever there are changes in the kind of material, or its moisture content. An inexperienced operator will often be required to replace a shear pin provided in the machine, when the machine has been overloaded because of an adjustment which is not exactly correct.

The present invention overcomes these difficulties by automatically adjusting the machine so that the tension in each bundle is substantially uniform.

An object of the invention is to provide a baling machine which automatically adjusts itself according to the pressure exerted by the bundle in the compression chamber.

Another object of the invention is to provide automatic means for maintaining the tension of the bales at a substantially constant predetermined figure.

Another object of the invention is to provide automatic tensioning means which can be set to give a predetermined range of adjustment.

Numerous other objects and advantages of the invention will be evident as the specification proceeds to describe the apparatus with reference to the drawings in which.

Figure 1:
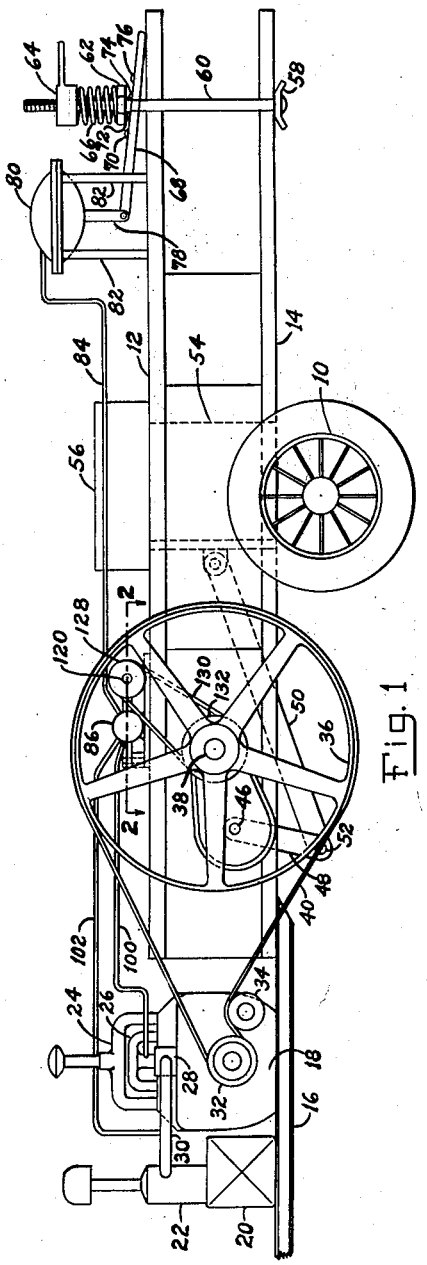
Fig. 1 is a side elevation of the automatic hay baler of my invention.

Referring to Fig. 1, the baler is supported for movement by a pair of rubber tired wheels 10. A top beam 12 and a bottom beam 14 extend the major portion of the machine, and they are free and flexible at the rear end of the machine so that they can be adjusted toward or from each other at this point to change the size of the compression chamber and in this way adjust the tension of the bale.

Figure 2:
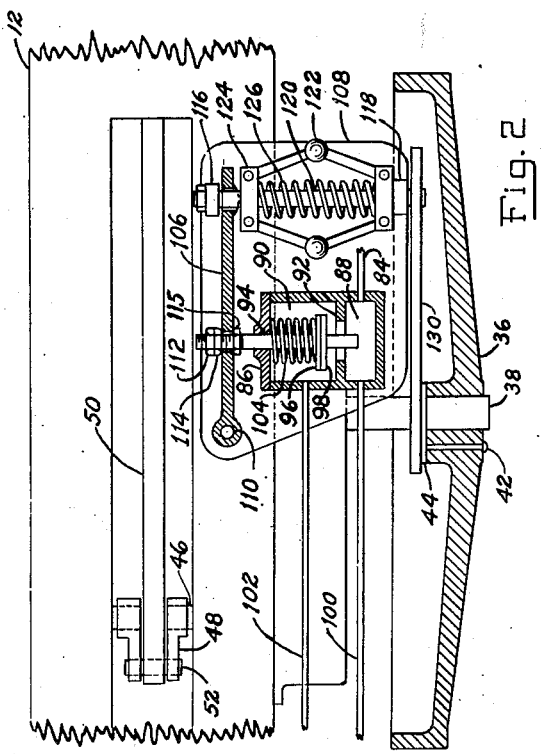
Fig. 2 is a view partly in section on the line 2—2 of Fig. 1 and showing details of a portion of my improved baler.

A frame 16 at the front of the machine supports an internal combustion engine 18, a fuel tank 20, and an air cleaner 22. The frame 16 has been shown broken at its front end, but the portion not shown has means by which the baler may be attached to a team of horses, a tractor, or other motorized vehicle. The engine 18 has an exhaust manifold 24, an intake manifold 26 and a carburetor 28. A pipe 30 leads from the air cleaner 22, to the carburetor 28. A pulley 32 is mounted on the crankshaft of the engine 18, and an idler pulley 34 is mounted on the frame of the engine. The baler has a large flywheel 36 which is mounted on but not keyed to the shaft, 38. A belt 40 runs over the flywheel 36, and the pulleys 32 and 34, so that pulley 32 drives the flywheel 36 by means of the belt 40. As shown in Fig. 2, the flywheel 36 has a shear pin 42 which is also fastened in a plate 44 which is keyed to the shaft 38 to transmit rotative force from flywheel 36 to shaft 38.

Shaft 38 drives shaft 46 through gears not shown, and shaft 46 drives crank 48 which is fixed to shaft 46. A connecting rod 50 is pivoted to the end of the crank 48 at 52. The connecting rod 50 is pivotally mounted at its other end to a combined knife and ram 54 which is slidably mounted between the top beam 12 and the bottom beam 14.

The baler has a loading mechanism indicated generally by numeral 56 which forces hay into the chamber between beams 12 and 14 when the combined knife and ram 54 is in retracted position. On the forward stroke of knife and ram 54, the knife slices off a portion of the hay and the ram compacts the slice against the previously compacted slice. When a number of slices have accumulated the operator ties some of the slices into a bale and the bale drops off the rear end of the baler.

Figure 3:
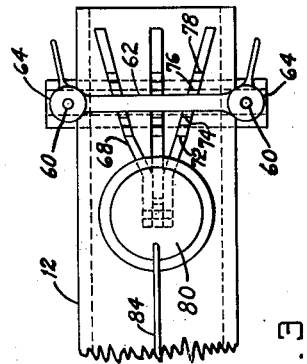
Fig. 3 is a plan view of the end portion of the baler.

Mechanism to provide adjustment of the top beam 12 and the bottom beam 14 toward each other is shown at the right hand end of Fig. 1 and in Fig. 3. A member 58 extends beneath the bottom beam 14 and extends beyond the beam 14 at both sides. A vertical rod 60 is fastened to each end of member 58. A cylindrical member 62 has at each end a flattened end portion with a hole therein. The rods 60 extend through the holes in the flattened end portions of member 62 and are threaded at their upper ends to receive nuts 64. A spring 66 surrounds each rod 60 and acts at one end against the nut 64 and at the other end against the flattened end portion of member 62. The cylindrical member 62 is supported by a trifurcated member 68 which has four rows of protuberances, 70, 72, 74, and 76. Member 68 could have two prongs instead of three if desired. The mechanism may be adjusted so that the cylindrical member 62 rests upon the trifurcated member 68 between any two adjacent rows of said protuberances, 70, 72, 74, and 76. The trifurcated end of member 68 rests upon top beam 12 and is pivoted at its other end to pull rod 78 of the fluid operated diaphragm 80, which has legs 82 resting upon top beam 12. The diaphragm 80 has not been shown in detail, because it is a well known device for converting changes in fluid pressure into mechanical movement. The diaphragm 80 is similar to the diaphragms in the brake system of vehicles. The diaphragm is connected by tube 84 to a valve, 86.

The valve 86 has two chambers 88 and 90, separated by a valve seat 92. A valve stem 94 is slidably mounted in the valve 86 and supports a closure member 96 having a rubber washer 98 secured thereto. The tube 84 from the diaphragm 80 is connected to the chamber 88. Another tube 100 connects chamber 88 with the suction manifold 26 of the engine. Tube 102 connects chamber 90 with the pipe 30 leading from the air cleaner 22 to the carburetor 28.

A spring 104 surrounds the valve stem 94 and acts at one end against the closure member 96 and at the other end against the body of the valve 86. The valve stem 94 extends through a hole in arm 106 which is pivotally mounted on a base plate 108 at 110. The valve stem 94 is threaded at its outer end and has two nuts 112 and 114 which may be adjusted and locked in adjusted position. A nut 115 may be adjusted on valve stem 94 to prevent chattering between the valve stem 94 and the arm 106. The base plate 108 has ears 116 and 118 rotatably supporting the shaft 120 of a flyball-governor 122. The actuating member 124 of the governor is slidably mounted on shaft 120 and acts against the arm 106. The governor is tensioned by a spring 126. The shaft 120 has fixed thereto a pulley 128 which is driven by a belt 130, which in turn is driven by a pulley 132 fixed to shaft 38.

The operation of the apparatus will now be described. The nuts 64 are adjusted to provide the proper tension of the bundle between beams 12 and 14 when operating on the hay of average dryness.

The nuts 112 and 114 are adjusted so that rubber washer 98 of closure member 96 is urged against the valve seat 92 at normal operating speed.

When the hay becomes less compressible for some reason, such as increased moisture content, the load on the engine 18 is increased and the machine and the engine 18 tend to slow down. The governor 122, which is driven by motor 18, tends to slow down and spring 126 overcomes the force from the centrifugal action of the governor and moves member 124 which in turn moves arm 106 about its pivot, 110. Arm 106 raises closure member 96 from valve seat 92, allowing air to pass from chamber 90 into chamber 88. The chamber 88, which had a vacuum equivalent to that in the suction manifold, now has substantially atmospheric pressure. Diaphragm 80, which is connected to chamber 88 by tube 84, responds to this change and pull rod 78 moves down and allows member 68 to pivot counterclockwise on its fulcrum on beam 12. Member 62 supported by member 68 is also allowed to move downwardly and the tension of spring 66 is reduced and the tension in the compression chamber between beams 12 and 14 is therefore reduced. In this way the deflection of beams 12 and 14 is automatically controlled to maintain proper tension in the compression chamber.

If desired the apparatus may be adjusted to operate independent of the flyball governor 122. This adjustment is made by merely backing off nuts 112 and 114 from shaft 94 a sufficient distance for washer 98 of closure member 96 to be forced against valve seat 92 regardless of the position of arm 106 and flyball governor 122. With this adjustment the diaphragm 80 is at all times under the pressure of the suction manifold, because it is connected to the suction manifold through tube 84, chamber 88, and tube 100.

With this adjustment in effect, an increase in pressure in the compression chamber increases the load on the engine 18, and the pressure in the suction manifold 26 of the engine increases. Since the diaphragm 80 is connected to the suction manifold as described, the pressure also increases in the diaphragm 80 and pull rod 78 moves downwardly to reduce the pressure in the compression chamber as described above. In this manner the pressure in the compression chamber may be automatically maintained at a substantially constant figure.

Although the invention has been described in detail, various modifications can be made without departing from the spirit of the invention, and I desire to be limited only by the claims.

I claim as my invention:

1. A baling machine comprising a frame, spaced substantially parallel, beam members having substantially opposite portions rigidly secured to the frame and being flexible at their remaining portions, said spaced beam members forming a compression chamber, adjustable tensioned means at the flexible portions of the beam members resiliently restraining the beam members from flexing outwardly, lever means fulcrumed on one of said beam members and supporting said adjustable tensioned means, fluid means connected to said lever means for moving said lever means about its fulcrum, an internal combustion engine having an intake manifold, a conduit connecting said fluid means and said intake manifold, valve means for admitting air to said conduit, rotatable centrifugal means, and means connected to said engine and to said centrifugal means for rotating said centrifugal means, said centrifugal means being operatively connected to said valve means to actuate said valve means.

2. A baling machine comprising a frame, a top member secured to said frame, a bottom member secured to said frame, said top and bottom members having resilient portions extending beyond said frame and being spaced from each other to form a compression chamber there between, a ram for compressing material in said compression chamber, an internal combustion engine having an intake manifold, drive means connecting said internal combustion engine and said ram, tensioned means urging said top and bottom members toward each other, a lever interposed between one of said members and said tensioned means, a fluid motor connected to said lever for actuating said lever, a conduit connecting said intake manifold and said fluid motor, a valve for opening and closing said conduit to a source of air, and means responsive to changes in speed of said drive means for actuating said valve.

3. A baling machine comprising a frame, a top member secured to said frame, a bottom member secured to said frame, said top and bottom members having resilient portions extending beyond said frame, and being spaced from each other to form a compression chamber there between, a ram for compressing material in said compression chamber, an internal combustion engine having an intake manifold, drive means connecting said internal combustion engine and said ram, tensioned means urging said resilient portions of said top and bottom members toward each other, a lever interposed between one of said members and said tensioned means, a fluid motor connected to said lever for actuating said lever, a conduit connecting said intake manifold and said fluid motor, an air filter, valve means connected to said air filter and said conduit for admitting air from said air filter to said conduit and means responsive to the speed of said drive means for opening or closing said valve means.

4. A baling machine comprising adjustable members forming a compression chamber therebetween, fluid operated means for controlling the resistance to outward movement of said adjustable members, means for compressing material in said compression chamber, an internal combustion engine connected to said compressing means for driving the same, said internal combustion engine having an intake manifold, and conduit means connecting said intake manifold and said fluid operated means whereby the fluid operated means is responsive to changes in pressure in the intake manifold.

RAYMOND I. BOBST.

REFERENCES CITED

The following references are of record in the file of this patent:

UNITED STATES PATENTS

| Number | Name | Date |
|---|---|---|
| 2,261,232 | Collins | Nov. 4, 1941 |
| 2,355,646 | Haase | Aug. 15, 1944 |
| 2,296,720 | Nolt | Mar. 19, 1946 |
| 2,411,467 | Russell | Nov. 19, 1946 |
| 2,478,012 | Raney | Aug. 2, 1949 |